US010782431B2

(12) United States Patent
Dossary et al.

(10) Patent No.: US 10,782,431 B2
(45) Date of Patent: Sep. 22, 2020

(54) SMOOTHING SEISMIC DATA

(71) Applicant: Saudi Arabian Oil Company, Dhahran (SA)

(72) Inventors: Saleh A. Dossary, Dammam (SA); Jinsong Wang, Dhahran (SA); Bander K. Jumah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 586 days.

(21) Appl. No.: 15/019,083

(22) Filed: Feb. 9, 2016

(65) Prior Publication Data
US 2017/0227664 A1   Aug. 10, 2017

(51) Int. Cl.
*G01V 1/36* (2006.01)
*G01V 1/30* (2006.01)
*G01V 1/34* (2006.01)

(52) U.S. Cl.
CPC ........... *G01V 1/364* (2013.01); *G01V 1/301* (2013.01); *G01V 1/34* (2013.01); *G01V 2210/324* (2013.01); *G01V 2210/64* (2013.01); *G01V 2210/642* (2013.01); *G01V 2210/643* (2013.01)

(58) Field of Classification Search
None
See application file for complete search history.

(56) References Cited

U.S. PATENT DOCUMENTS

| | | | |
|---|---|---|---|
| 5,586,082 A | 12/1996 | Anderson et al. | |
| 6,311,130 B1 | 10/2001 | Huang | |
| 6,735,526 B1 | 5/2004 | Meldahl et al. | |
| 8,095,319 B2 | 1/2012 | Klein et al. | |
| 8,447,524 B2 | 5/2013 | Chen et al. | |
| 2002/0022930 A1* | 2/2002 | Bouts .................. | G01V 1/30 702/14 |
| 2006/0122780 A1 | 6/2006 | Cohen et al. | |

(Continued)

FOREIGN PATENT DOCUMENTS

WO   WO2009142872   11/2009

OTHER PUBLICATIONS

International Search Report and Written Opinion of the International Searching Authority issued in International Application No. PCT/US2017/013713 dated Apr. 20, 2017; 13 pages.

(Continued)

*Primary Examiner* — Khaja Ahmad
(74) *Attorney, Agent, or Firm* — Fish & Richardson P.C.

(57) ABSTRACT

The present disclosure describes methods and systems, including computer-implemented methods, computer program products, and computer systems, for smoothing seismic data. One computer-implemented method includes obtaining, by a hardware data processing apparatus, a plurality of seismic data samples; forming, by the hardware data processing apparatus, guiding vectors using the plurality of seismic data samples and a plurality of guiding structure attributes; generating, by the hardware data processing apparatus, a structure guided directional weighted vector filter using the guiding vectors and a plurality of weighting factors; filtering, by the hardware data processing apparatus, the seismic data samples using the structure guided directional weighted vector filter to generate smoothed seismic data; and initiating output of the smoothed seismic data.

21 Claims, 15 Drawing Sheets

(56) References Cited

U.S. PATENT DOCUMENTS

| | | | |
|---|---|---|---|
| 2006/0133206 A1 | 6/2006 | Barnes | |
| 2008/0255761 A1* | 10/2008 | Wang | G01V 1/28 702/17 |
| 2010/0232697 A1* | 9/2010 | Mishima | G06K 9/4647 382/168 |
| 2011/0115787 A1 | 5/2011 | Kadlec | |
| 2013/0064040 A1* | 3/2013 | Imhof | G01V 1/306 367/73 |
| 2013/0262061 A1 | 10/2013 | Laake | |
| 2013/0345985 A1* | 12/2013 | Priezzhev | G01V 1/28 702/14 |
| 2014/0188392 A1* | 7/2014 | Aarre | G01V 1/301 702/14 |

OTHER PUBLICATIONS

Fehmers et al., "Fast Structural Interpretation with Structure-Oriented Filtering," Geophysics, vol. 68, No. 4, Jul. 2003; pp. 1286-1293.

Lavialle et al,, "Seismic Fault Preserving Diffusion," Journal of Applied Geophysics, vol. 61, No. 2, Dec. 30, 2006; pp. 132-141.

Mariurt, "Robust Estimates of 3D Reflector DIP and Azimuth," Geophysics, vol. 71, No. 4, Jul. 1, 2006; pp. P29-P40.

Nagao et al., "Note—Edge Preserving Smoothing", Computer Graphics and Image Processing, Published in 1979, vol. 3, pp. 394-407.

Luo et al., "Edge-Preserving Smoothing and Applications", The Leading Edge, Feb. 2002, 5 pages.

Luo et al., "Generalized Hilbert Transform and its Applications in Geophysics", The Leading Edge, Mar. 2003, 4 pages.

AlBinHassan et al., "3D Edge-Preserving Smoothing and Applications", Geophysics, vol. 71, Jul.-Aug. 2006, 7 pages.

Liu, "Adaptive Scalar and Vector Median Filtering of Noisy Colour Images based on Noise Estimation", IET Image Processing, Published in 2009, 13 pages.

Lee et al., "Generalized Median Filtering and Related Nonlinear Filtering Techniques", IEEE Transactions on Acoustics, Speech, and Signal Processing, vol. ASSP-33, No. 3, Jun. 1985, 12 pages.

Lukac, "Adaptive Vector Median Filtering", Pattern Recognition Letters, Published in 2003, 11 pages.

Astola et al., "Vector Median Filters", Proceedings of the IEEE, vol. 78, No. 4, Apr. 1990, 12 pages.

Hale, "Structure-Oriented Smoothing and Semblance", CWP-635, Published in 2009, 10 pages.

Toujas et al., "Structure Tensor Field Regularization based on Geometric Features", 18th European Signal Processing conference, Aug. 2010, 5 pages.

Wang et al., "Structure-Oriented Gaussian Filter for Seismic Detail Preserving Smoothing", ICIP, Published in 2009, 4 pages.

Liu, "Noise Reduction by Vector Median Filtering", Geophysics, vol. 78, No. 3, May-Jun. 2013, 8 pages.

Liu et al., "Vector Median Filter and its Applications in Geophysics", SEG Houston 2009, International Exposition and Annual Meeting, Published in 2009, 5 pages.

Zang et al., "Guided Adaptive Image Smoothing via Directional Anisotropic Structure Measurement", IEEE Transactions on Visualization and Computer Graphics, vol. 21, No. 9, Sep. 2015, 13 pages.

Gulf Cooperation Council Examination Report issued in GCC Application No. GC 2017-32899 on Apr. 1, 2019, 3 pages.

Gulf Cooperation Council Examination Report issued in GCC Application No. GC 2017-32899 on Dec. 28, 2018, 4 pages.

* cited by examiner

SMOOTHING SEISMIC DATA

BACKGROUND

In some cases, in the petroleum industry, geological structures of a reservoir can be analyzed based on seismic data. The seismic data may include, for example, amplitude data, time/horizon data, frequency data, and other data. In some cases, images can be generated based on the seismic data to determine geological sub-structures, e.g., fracture, faults, and channels, of a reservoir.

SUMMARY

The present disclosure describes methods and systems, including computer-implemented methods, computer program products, and computer systems, for smoothing seismic data. One computer-implemented method includes obtaining, by a hardware data processing apparatus, a plurality of seismic data samples; forming, by the hardware data processing apparatus, guiding vectors using the plurality of seismic data samples and a plurality of guiding structure attributes, wherein the plurality of guiding structure attributes are calculated based on the a plurality of seismic data samples; generating, by the hardware data processing apparatus, a structure guided directional weighted vector filter using the guiding vectors and a plurality of weighting factors; filtering, by the hardware data processing apparatus, the seismic data samples using the structure guided directional weighted vector filter to generate smoothed seismic data; and initiating output of the smoothed seismic data.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further includes updating the plurality of seismic data samples using the smoothed seismic data; and repeating the forming, generating, and filtering until a satisfactory criteria is met.

A second aspect, combinable with any of the previous aspects, wherein the plurality of seismic data samples comprise amplitude data.

A third aspect, combinable with any of the previous aspects, wherein the plurality of seismic data samples comprise 3-dimensional (3D) post-stack seismic data, and the plurality of seismic data samples are segmented into horizontal 2-dimensional (2D) blocks for filtering.

A fourth aspect, combinable with any of the previous aspects, wherein the plurality of guiding structure attributes include at least one of an edge detection attribute or a skeleton attribute.

A fifth aspect, combinable with any of the previous aspects, wherein the plurality of weighting factors are generated using an anisotropic Gaussian function.

A sixth aspect, combinable with any of the previous aspects, wherein the plurality of weighting factors are generated based on a structure tensor analysis.

A seventh aspect, combinable with any of the previous aspects, further includes updating the plurality of guiding structure attributes based on the smoothed seismic data; and initiating output of the updated guiding structure attributes.

The subject matter described in this specification can be implemented in particular implementations so as to realize one or more of the following advantages. The approach may provide smoothed seismic data that can be used to produce high quality visualizations of the reservoir structure. The visualizations may increase the resolution of geological sub-structures, e.g. fractures, channels, and faults, and therefore assist geological interpreters to build enhanced reservoir models, which may lead to improved drilling location accuracy and reduced operational cost. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes methods and systems, including computer-implemented methods, computer program products, and computer systems, for smoothing seismic data. The following detailed description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

In a reservoir analysis, seismic data can be used to build geological models characterizing geological sub-structures of the reservoir, for example faults, fractures, and channels. In some cases, these geological structures may appear as sharp edges, and therefore are not easily detected. In some cases, the seismic data input may be smoothed to obtain a high quality visualization of the edge structure. For example, the seismic data input may be filtered to suppress random noise. In some cases, an edge preserving smoothing filter may be used to preserve the edge structure prior to applying edge detection algorithms. For example, a conventional median vector filter can be used to smooth the seismic data. However, a conventional median vector filter does not take into account the structural information of the seismic data input, and therefore may not produce structural images with high resolutions of geological sub-structures.

In some cases, a structure guided directional weighted vector filter can be used to smooth the seismic data. The structure guided directional weighted vector filter can be formed using geological structure attributes generated based on the seismic data. The structure guided directional weighted vector filter can further include directional weighting factors. In some cases, the smoothing process can be performed iteratively to improve the resolution of geological sub-structures, e.g. fractures, channels, and faults. FIGS. 1-9 and associated descriptions provide additional details of these implementations.

Figure 1:
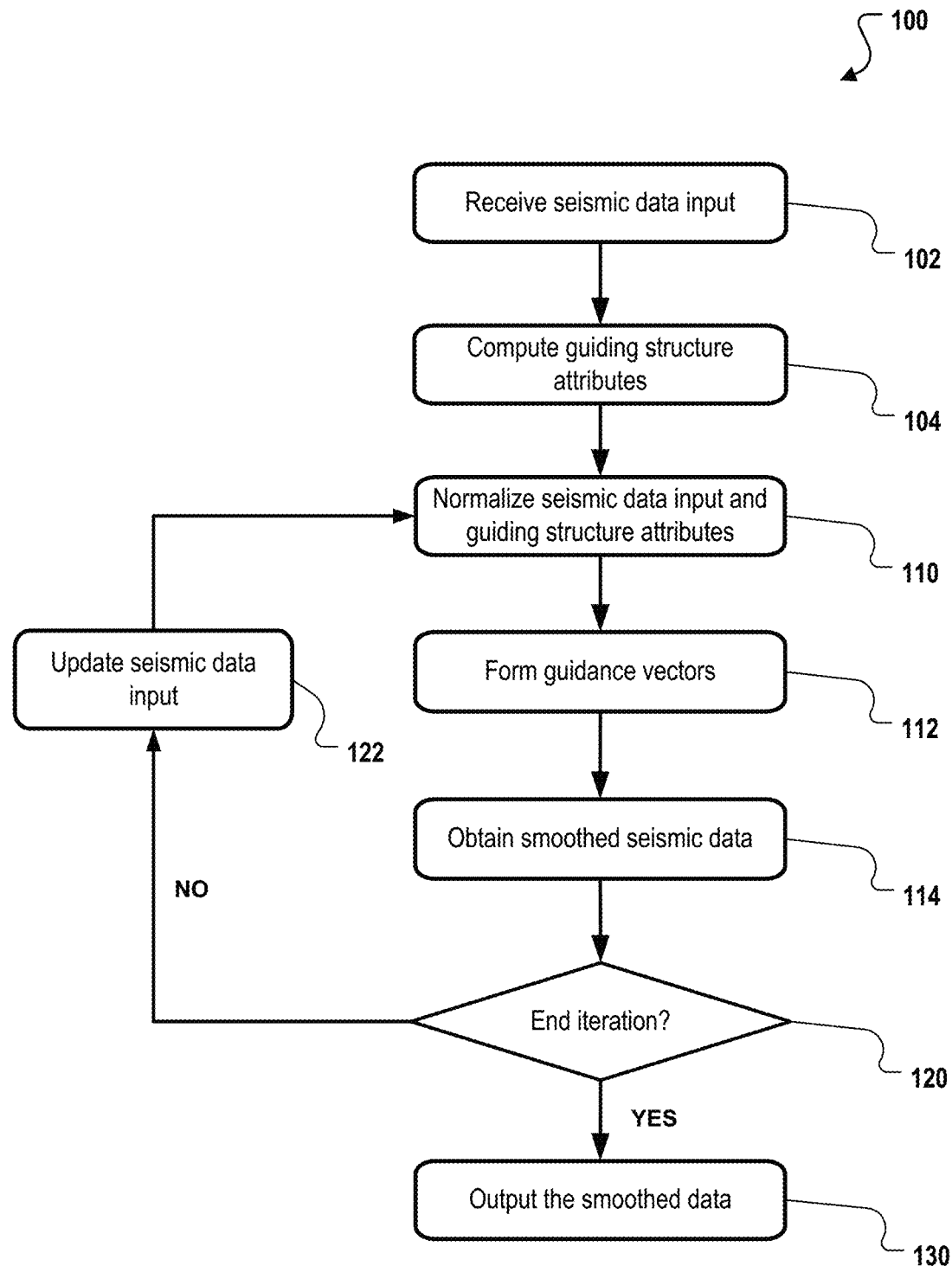
FIG. 1 illustrates an example method for smoothing seismic data, according to an implementation.

FIG. 1 illustrates an example method 100 for smoothing seismic data, according to an implementation. For clarity of presentation, the description that follows generally describes method 100 in the context of FIGS. 2-9. However, it should be understood by those of ordinary skill in the art that method 100 may be performed, for example, by any other suitable system, environment, software, and hardware, or a combination of systems, environments, software, and hardware as appropriate. In some implementations, various steps of method 100 can be run in parallel, in combination, in loops, and/or in any order.

At 102, seismic data input is received. In some cases, the seismic data input can include amplitude data. In some cases, the seismic data input can be three-dimensional (3D). In some cases, the seismic data input can include post-stack data that is generated based on pre-stack data. For example, pre-stack data can be collected during field seismic survey of a reservoir. The pre-stack data can be processed in one or more steps of seismic data processing. Examples of the seismic data processing steps include surface statics correction, noise removal, normal move out (NMO) procedure, etc.

Figure 2:
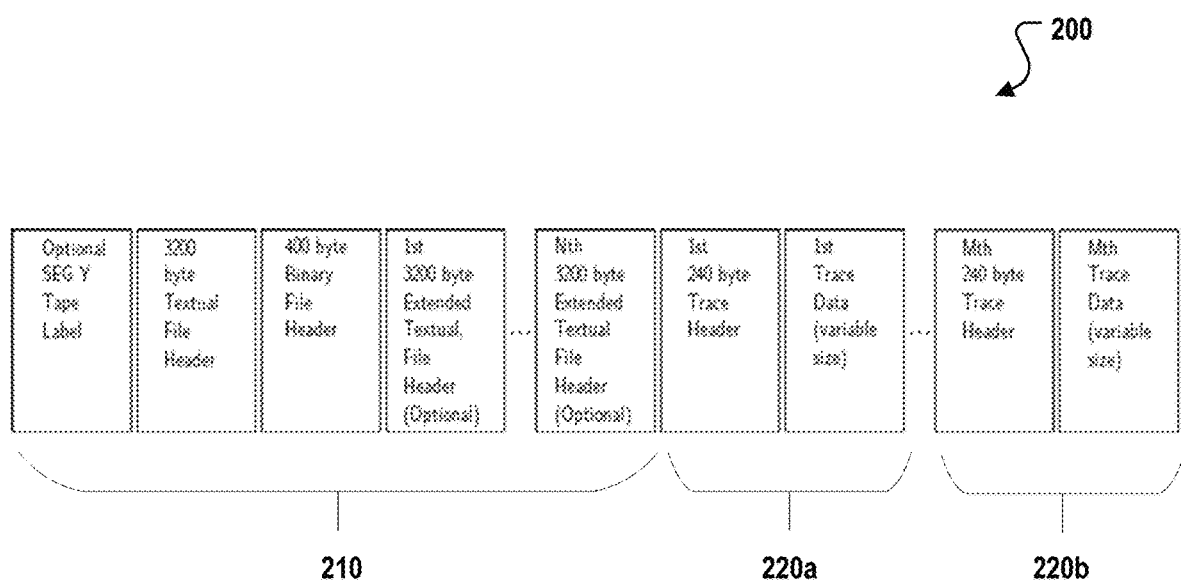
FIG. 2 is an example Society of Exploration Geophysicists (SEG)-Y (SEGY) file storing seismic data input, according to an implementation.

In some cases, the seismic data input can be stored in a Society of Exploration Geophysicists (SEG) format, e.g., the SEG-Y (SEGY) format. FIG. 2 is an example SEGY file 200 storing seismic data input, according to an implementation. The file 200 includes a file header 210 and one or more trace files 220a-b. The file header 210 can include an optional SEGY tape label, a textual file header, a binary file header, and one or more optional extended textual file headers. In some cases, the seismic data input are stored trace by trace. Each trace file, e.g., trace files 220a-b, can include a trace header and trace data. The trace header 222 can include the geometry information for the raw geophysical data in the trace. Examples of the geometry information include the inline number, the cross line number, sample rate, depth, and recorded time for the seismic data input. The trace data can include samples of the seismic data input for smoothing. In some implementations, the SEGY file can be retrieved and the seismic data input can be read from the SEGY file.

In some cases, the 3D post-stack data can be segmented into horizontal two-dimensional (2D) blocks. For each iteration of the smoothing process, these horizontal 2D blocks are processed vertically. For example, the top 2D block is processed first, followed by the 2D block below the top 2D block. The process repeats until all of the 2D blocks are processed for the current iteration.

Figure 3:
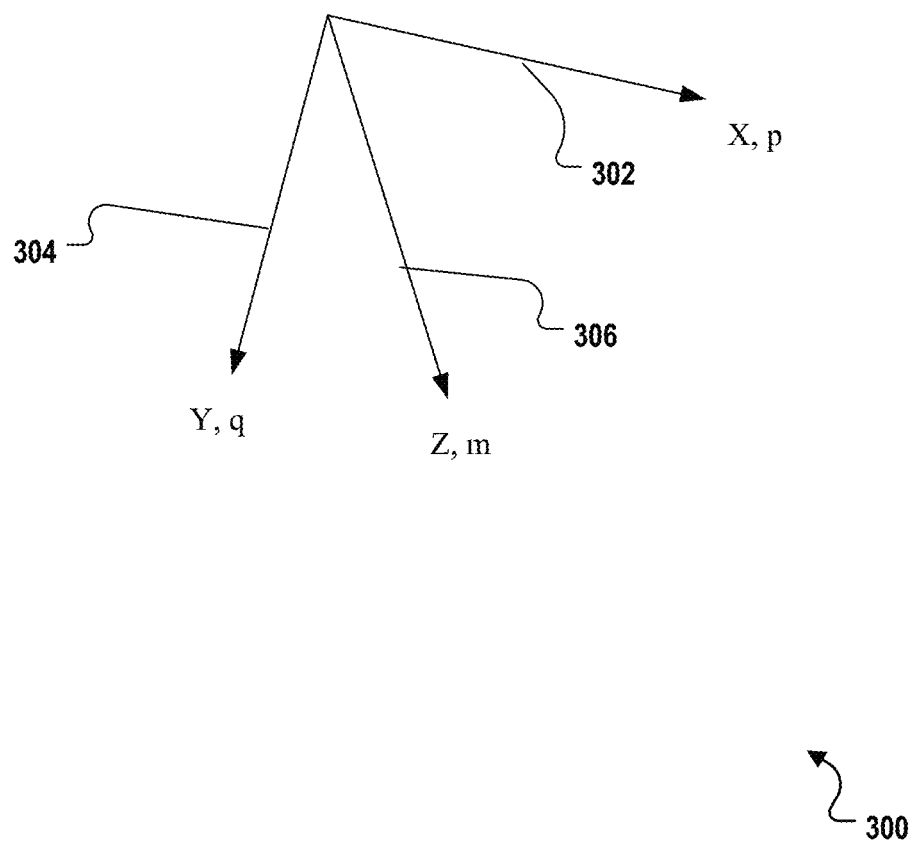
FIG. 3 is a high-level diagram illustrating the segmentation of the seismic data input, according to an implementation.

FIG. 3 is a high-level diagram 300 illustrating the segmentation of the seismic data input, according to an implementation. The diagram 300 includes 3 axis: X-axis 302, Y-axis 304, and Z-axis 306. As shown in FIG. 3, the seismic data input includes p samples on the X-axis 302, q samples on the Y-axis 304, and m samples on the Z-axis 306. In the illustrated example, the seismic data input can be segmented into m slides along the Z-axis 306. Each slice includes N number of samples, where N=p×q.

Returning to FIG. 1, from 102, the method 100 proceeds to 104, where guiding structure attributes are computed. In some cases, guiding structure attributes can include edge detection attributes and skeleton attributes. In a reservoir analysis, edge detection attributes are post-processed data indicating presences of subsurface discontinuities such as faults and channels. In some cases, seismic data input, e.g., amplitude data, can be processed using an edge detection algorithm to generate the corresponding edge detection attributes. In one example, generalized Hilbert transform (GHT) can be used as the edge detection algorithm. Other examples of edge detection algorithms include Hilbert transform (HT), coherence cube, eigenvalue coherence cube, and derivative method.

Skeleton attributes are post-processed data representing a thinner version of the edge structure. In some cases, edge detection attributes can be further processed using skeleton algorithms to generate corresponding skeleton attributes. Examples of the skeleton algorithms include fast parallel thinning algorithm, minimal spanning tree algorithm, and other thinning algorithms.

In some cases, other structural attributes can be computed. Examples of the other structural attributes include coherence attributes and energy entropy attributes. In some cases, these attributes can be used as guiding structural attributes in addition to or as an alternative to the edge detection attributes and skeleton attributes.

From 104, the method 100 proceeds to 110, where the seismic data input and the corresponding guiding structure attributes are normalized. In some cases, as discussed above, the guiding structure attributes can include the edge detection attributes and the skeleton attributes. In these or other cases, the seismic data input, the edge detection attributes, and the skeleton attributes formed three components of the input to the filtering processes. In some cases, the ranges for three components, e.g., the seismic data input, the edge detection attributes, and the skeleton attributes, may be different. During the normalization process, each component can be scaled to fit within the same range. In one example, each component can be normalized to a range of (−255, 255). In some cases, each component can also be multiplied by a ratio. In some cases, different ratios can be used for different components. Assigning a higher ratio to one component can increase the effect of that particular component.

From 110, the method 100 proceeds to 112, where guidance vectors are formed based on seismic data input and the guiding structure attributes. In some cases, a guidance vector can be formed for each sample of the seismic data input using the components of the corresponding sample and its neighboring samples.

Figure 4:
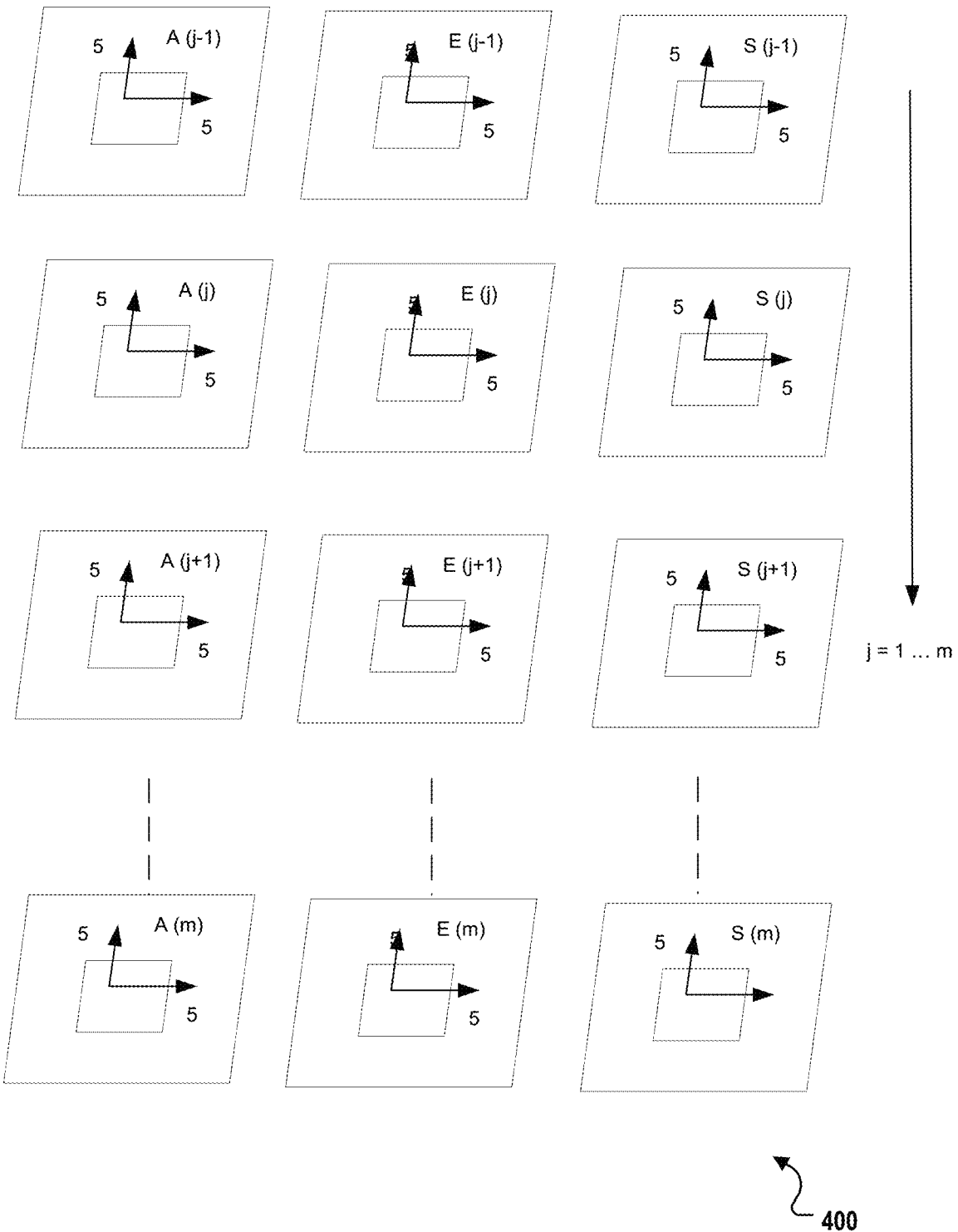
FIG. 4 is a high-level diagram illustrating the formation of the guidance vectors, according to an implementation.

FIG. 4 is a high-level diagram 400 illustrating the formation of the guidance vectors, according to an implementation. As shown in FIG. 4, each of the components, the seismic data input (shown as A(j−1), A(j) . . . A(m)), the edge detection attributes (shown as E(j−1), E(j) . . . E(m)), and the skeleton attributes (shown as S(j−1), S(j) . . . S(m)) are segmented into m slices on the vertical direction. Each slice includes N=p×q samples, where p and q represent samples on the X-axis and Y-axis, respectively. In one example, for each of the N samples, a guidance vector can be formed using 5 seismic data input samples, 5 edge detection attributes, and 5 skeleton attributes. For example, a guidance vector for A(j) can be formed as (A(j−2), A(j−1), A(j), A(j+1), A(j+2), E(j−2), E(j−1), E(j), E(j+1), E(j+2), S(j−2), S(j−1), S(j), S(j+1), S(j+2)). In some implementations, the length of the guidance vector can be increased or decreased when different numbers of neighboring samples are included. In some cases, e.g., at the boundary slices, the sample points in each vector may be less than 15 because there are no neighboring slices in one direction. For example, for the samples in the slice m, A(m+1), E(m+1), S(m+1), A(m+2), E(m+2), or S(m+2) do not exist, and therefore the length of the vector is 9 for each sample point in the slice m.

In some cases, a fixed size filtering window can be used for the filtering process. In one example, as shown in FIG. 4, a 5×5 filtering window can be used. In the illustrated example, the seismic data input in each slice are filtered through the horizontal plane using a 5×5 filtering window. Therefore, the filtering window includes 5×5=25 vectors.

From 112, the method 100 proceeds to 114, where the seismic data input are processed using the guidance vector to generate smoothed seismic data. In some implementation, a directional weighted vector median filter is used to process the seismic data input.

In some cases, a median vector can be generated in a set of vectors. As discussed above, in one example, the filtering window includes 25 vectors. A median vector can be generated by finding a vector in the 25 vectors that has a minimum total distance to all the rest of vectors. The following equation presents an example calculation of finding the median vector in a filtering window.

$$\arg\_\min(\vec{v}_{med}) = \{\Sigma_i \|\vec{v}_i - \vec{v}_{med}\|^2\},$$

where $\vec{v}_i$ represents each vector in the set of vectors of the filtering window In some cases, a weighting function can be introduced in the median vector calculation to generate a directional weighted median vector. The following equation presents an example calculation of a directional weighted median vector.

$$\arg\_\min(\vec{v}_{med}) = \{\Sigma_i w_i \|\vec{v}_i - \vec{v}_{med}\|^2\},$$

where $w_i$ represents a weighting function.

In some cases, the weighting function $w_i$ can be a Gaussian anisotropic weighting function. The Gaussian anisotropic weighting function can be determined by a structure tensor analysis of one of the components. For example, a structural orientation direction can be estimated based on the seismic data input using a structure tensor analysis. The coefficients of the weighting function $w_i$, e.g., the weights, can be adjusted to shape the resulting Gaussian filter based on the structural orientation. In one example, the weights along the structure orientation direction can be set to smaller values, which causes the resulting Gaussian function to decrease slowly along the structure orientation direction. The weights along the direction that is orthogonal to the structure orientation direction can be set to larger values, which makes the resulting Gaussian function to decrease fast along the direction that is opposite to the structure orientation direction. Therefore, the shape of the filter is elliptical, with its long axis parallel to the structure orientation direction. For a window size of 5×5, 25 weighting coefficients can be set for each sample, and multiplied to each of the 25 vectors discussed previously.

In some cases, a structure guided directional weighted vector filter can be formed using the resulting directional weighted median vector discussed above. For example, as discussed above, for a window size of 5×5, there can be 25 points in the square of the window. Thus, there are 25 vectors in the square. The length of each vector is 15. For example, the vector V(j) for the point A(j) is (A(j−2), A(j−1), A(j), A(j+1), A(j+2), E(j−2), E(j−1), E(j), E(j+1), E(j+2), S(j−2), S(j−1), S(j), S(j+1), S(j+2)). There are 25 directional weighting coefficients W(j), each corresponding to one point in the 5×5 window. Those coefficients can be anisotropic (without weighting, either 1 or 0). Each element in the vector V(j) is then multiplied with the corresponding weighting coefficients W(j). For example, the elements of the structure guided directional weighted vector become (W(j−2)*A(j−2), W(j−1)*A(j−1), W(j)*A(j), W(j+1)*A(j+1), W(j+2)*A(j+2), W(j−2)*E(j−2), W(j−1)*E(j−1), W(j)*E(j), W(j+1)*E(j+1), W(j+2)*E(j+2), W(j−2)*S(j−2), W(j−1)*S(j−1), W(j)*S(j), W(j+1)*S(j+1), W(j+2)*S(j+2)) The seismic data input can be filtered by the structure guided directional weighted vector filter to generate smoothed seismic data.

Using a structure guided directional weighted vector filter may provide one or more advantages. For example, the thin-line type structure can be enhanced using the structure guided directional weighted vector filter because more smoothing effects are produced along the local flow direction and less smoothing effects are produced along the perpendicular direction.

Figure 5:
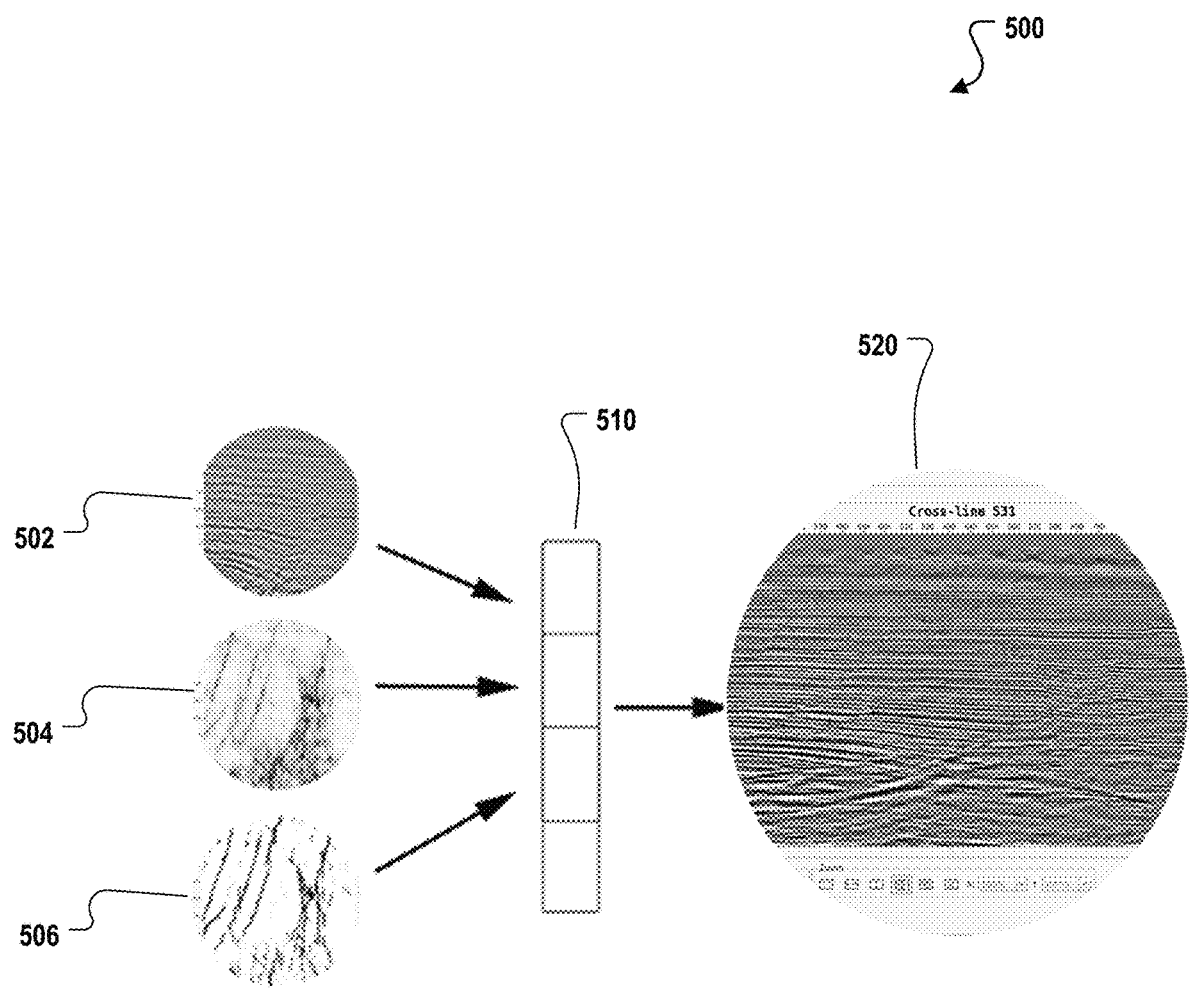
FIG. 5 is a high-level diagram illustrating an example structure guided directional weighted vector filter, according to an implementation.

FIG. 5 is a high-level diagram 500 illustrating an example structure guided directional weighted vector filter, according to an implementation. As shown in FIG. 5, a structure guided directional weighted vector filter 510 is used to filter seismic data input 502 to produce smoothed seismic data 520. Furthermore, both the seismic data input 502 and structure attributes are used to form the structure guided directional weighted vector filter 510. These structure attributes include edge detection attribute 504 and skeleton attribute 506.

Returning to FIG. 1, from 114, the method 100 proceeds to 120, where the smoothed seismic data is examined to determine whether the iteration should end. In some cases, whether target resolution has been achieved can be determined based on qualitative or quantities criteria, e.g., whether the image quality is satisfactory. In some cases, an image quality can be satisfactory if a target resolution is obtained. If the image quality is not satisfactory, the method 100 proceeds to 122, where the next iteration begins. At 122, the seismic data input is updated by replacing the seismic data input with the smoothed seismic data produced at 114. The updated guiding structure attributes are also computed based on the updated seismic data input. From 122, the method 100 proceeds to 110, where the updated seismic data input and the guiding structure attributes are normalized and the filtering process continues.

If the image quality is satisfactory, the method 100 proceeds from 120 to 130, where the smoothed seismic data is outputted. In some cases, the output data can be stored in a SEGY format. In some cases, the updated guiding structure attributes can also be outputted.

In some cases, the iteration may end based on a preset number of iterations (for example, 5 or 10). In some cases, the iteration may end based on comparing the output of consecutive iterations. For example, the iteration may end if the image quality of the output does not improve significantly compared to the image quality of the output from the previous iteration.

In some cases, the output data can be used to produce improved images that display pronounced geological structures such as fractures, channels and faults, and therefore enhancing structural and stratigraphic interpretation. Better interpretation of geological structure of a reservoir can help improve drilling location accuracy and reduce operation costs.

Figure 6:
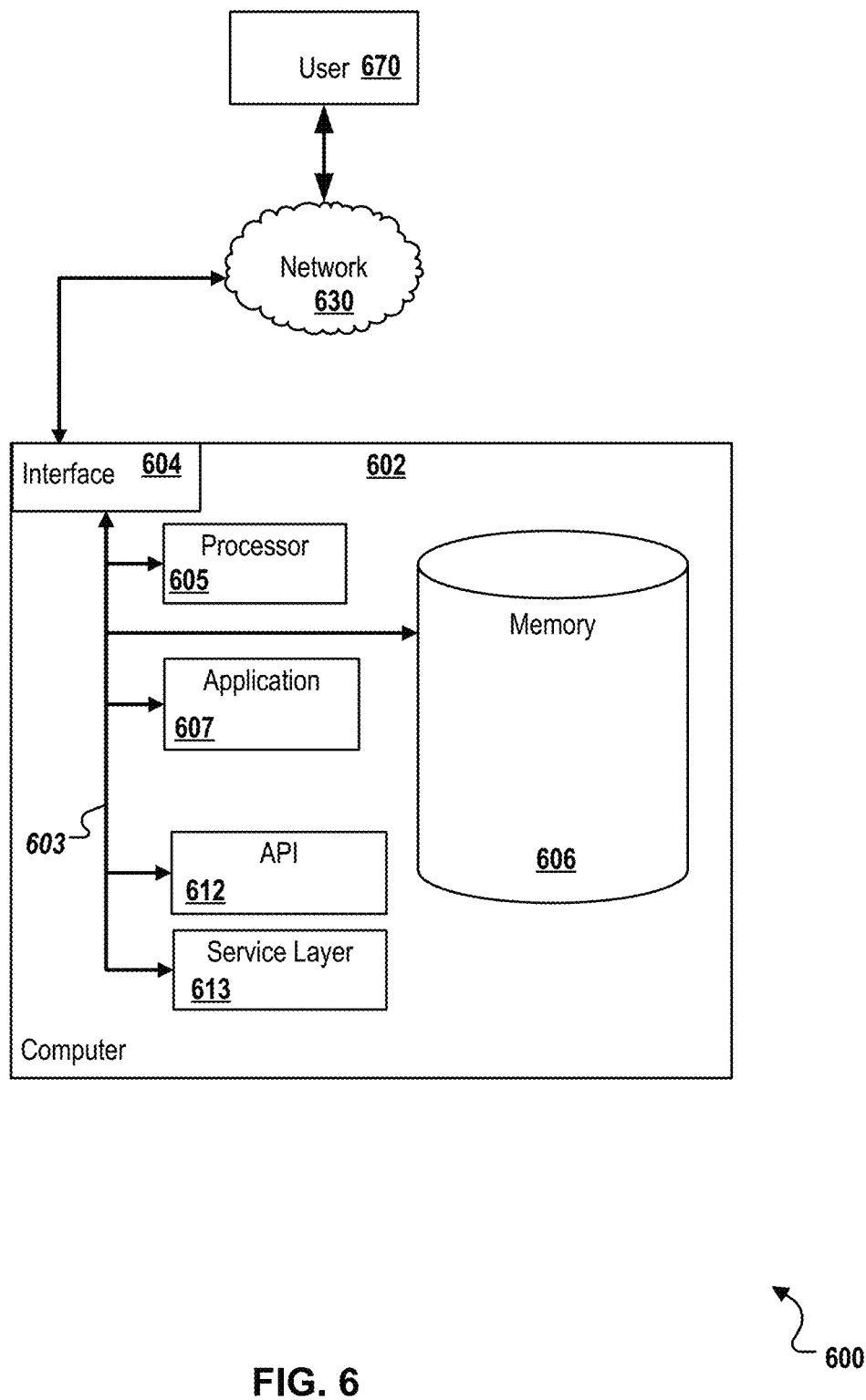
FIG. 6 is a high-level architecture block diagram of a seismic data processing system, according to an implementation.

FIG. 6 is a high-level architecture block diagram of a seismic data processing system 600, according to an implementation. At a high-level, the illustrated system 600 includes a user 670 that is communicably coupled with a seismic data processing computer 602 through a network 630. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The user 670 represents a person, an application, a set of applications, software, software modules, hardware, or a combination thereof that can perform a seismic data processing procedure. For example, the user 670 can be a reservoir analyst in a company that is responsible for reservoir modeling.

The network 630 facilitates communications between the components of the system 600 (e.g., between the user 670 and the seismic data processing computer 602). In some cases, the user 670 can access the seismic data processing computer 602 from a remote network. In these or other cases, the network 630 can be a wireless or a wireline network. In some cases, the user 670 can access the seismic data processing computer 602 locally. In these or other cases, the network 630 can also be a memory pipe, a hardware connection, or any internal or external communication paths between the components.

The seismic data processing computer 602 includes a computing system configured to smooth seismic data. In some cases, the algorithm of the seismic data smoothing process can be implemented in an executable computing code, e.g., C/C++ executable codes. Alternatively or in combination, the algorithm of the seismic data smoothing process can be implemented in an application program, e.g., EXCEL. In some cases, the seismic data processing computer 602 can include a standalone Linux system that runs batch applications. In some cases, the seismic data processing computer 602 can include mobile or personal computers that run the application program.

The computer 602 may comprise a computer that includes an input device, such as a keypad, keyboard, touch screen, microphone, speech recognition device, other device that can accept user information, and/or an output device that conveys information associated with the operation of the computer 602, including digital data, visual and/or audio information, or a GUI.

The computer 602 can serve as a client, network component, a server, a database or other persistency, and/or any other component of the system 600. In some implementations, one or more components of the computer 602 may be configured to operate within a cloud-computing-based environment.

At a high-level, the computer 602 is an electronic computing device operable to receive, transmit, process, store, or manage data and information associated with the system 600. According to some implementations, the computer 602 may also include or be communicably coupled with an application server, e-mail server, web server, caching server, streaming data server, business intelligence (BI) server, and/or other server.

The computer 602 can receive requests over network 630 from a client application (e.g., executing on another computer 602) and respond to the received requests by processing the said requests in an appropriate software application. In addition, requests may also be sent to the computer 602 from internal users (e.g., from a command console or by another appropriate access method), external or third parties, other automated applications, as well as any other appropriate entities, individuals, systems, or computers.

Each of the components of the computer 602 can communicate using a system bus 603. In some implementations, any and/or all the components of the computer 602, both hardware and/or software, may interface with each other and/or the interface 604 over the system bus 603 using an application programming interface (API) 612 and/or a service layer 613. The API 612 may include specifications for routines, data structures, and object classes. The API 612 may be either computer language-independent or -dependent and refer to a complete interface, a single function, or even a set of APIs. The service layer 613 provides software services to the computer 602 and/or the system 600. The functionality of the computer 602 may be accessible for all service consumers using this service layer. Software services, such as those provided by the service layer 613, provide reusable, defined business functionalities through a defined interface. For example, the interface may be software written in JAVA, C++, or other suitable languages providing data in Extensible Markup Language (XML) format or other suitable formats. While illustrated as an integrated component of the computer 602, alternative implementations may illustrate the API 612 and/or the service layer 613 as stand-alone components in relation to other components of the computer 602 and/or system 600. Moreover, any or all parts of the API 612 and/or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602 and/or system 600. The interface 604 is used by the computer 602 for communicating with other systems in a distributed environment—including within the system 600—connected to the network 630 (whether illustrated or not). Generally, the interface 604 comprises logic encoded in software and/or hardware in a suitable combination and operable to communicate with the network 630. More specifically, the interface 604 may comprise software supporting one or more communication protocols associated with communications such that the network 630 or interface's hardware is operable to communicate physical signals within and outside of the illustrated system 600.

The computer 602 includes a processor 605. Although illustrated as a single processor 605 in FIG. 6, two or more processors may be used according to particular needs, desires, or particular implementations of the computer 602 and/or the system 600. Generally, the processor 505 executes instructions and manipulates data to perform the operations of the computer 602. Specifically, the processor 605 executes the functionality required for smoothing seismic data. In some cases, the processor 605 can include a data processing apparatus.

The computer 602 also includes a memory 606 that holds data for the computer 602 and/or other components of the system 600. Although illustrated as a single memory 606 in FIG. 6, two or more memories may be used according to particular needs, desires, or particular implementations of the computer 602 and/or the system 600. While memory 606 is illustrated as an integral component of the computer 602, in alternative implementations, memory 606 can be external to the computer 602 and/or the system 600.

The application 607 is an algorithmic software engine providing functionality according to particular needs, desires, or particular implementations of the computer 602 and/or the system 600, particularly with respect to functionality required for smoothing seismic data. For example, application 607 can serve as one or more components/ applications described in FIGS. 1-5 and 7-9. Further, although illustrated as a single application 607, the application 607 may be implemented as multiple applications 607 on the computer 602. In addition, although illustrated as integral to the computer 602, in alternative implementations, the application 607 can be external to the computer 602 and/or the system 600.

There may be any number of computers 602 associated with, or external to, the system 500 and communicating over network 630. Further, the terms "client," "user," and other appropriate terminology may be used interchangeably as appropriate without departing from the scope of this disclosure. Moreover, this disclosure contemplates that many users may use one computer 602, or that one user may use multiple computers 602.

Figure 7A:
FIG. 7A illustrates an example image generated based on the unsmoothed seismic data input, according to an implementation.
Figure 7B:
FIG. 7B illustrates an example image generated based on smoothed seismic data, according to an implementation.
Figure 7C:
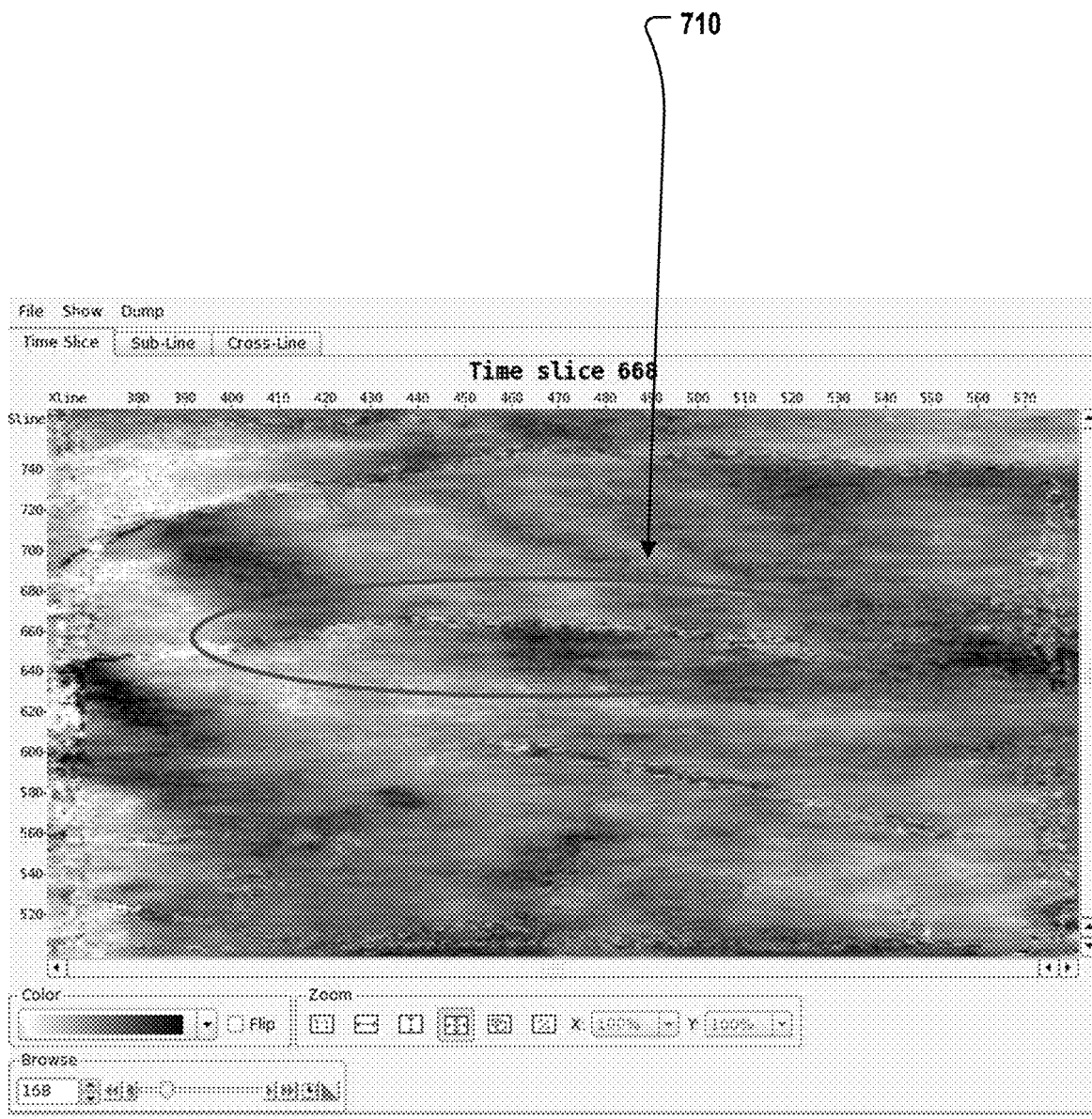
FIG. 7C illustrates an example image generated based on smoothed seismic data, according to a different implementation.

FIGS. 7A-7C illustrate example images generated based on seismic data, according to an implementation. FIG. 7A illustrates an example image 702 generated based on the unsmoothed seismic data input. FIG. 7B illustrates an example image 704 generated based on the seismic data that are smoothed using a conventional median filter. FIG. 7C illustrates an example image 706 generated based on the seismic data processed using the smoothing method 100 discussed previously. As shown in FIGS. 7A-7C, the image 706 shows a fault line 710, which the image 704 fails to show.

Figure 8A:
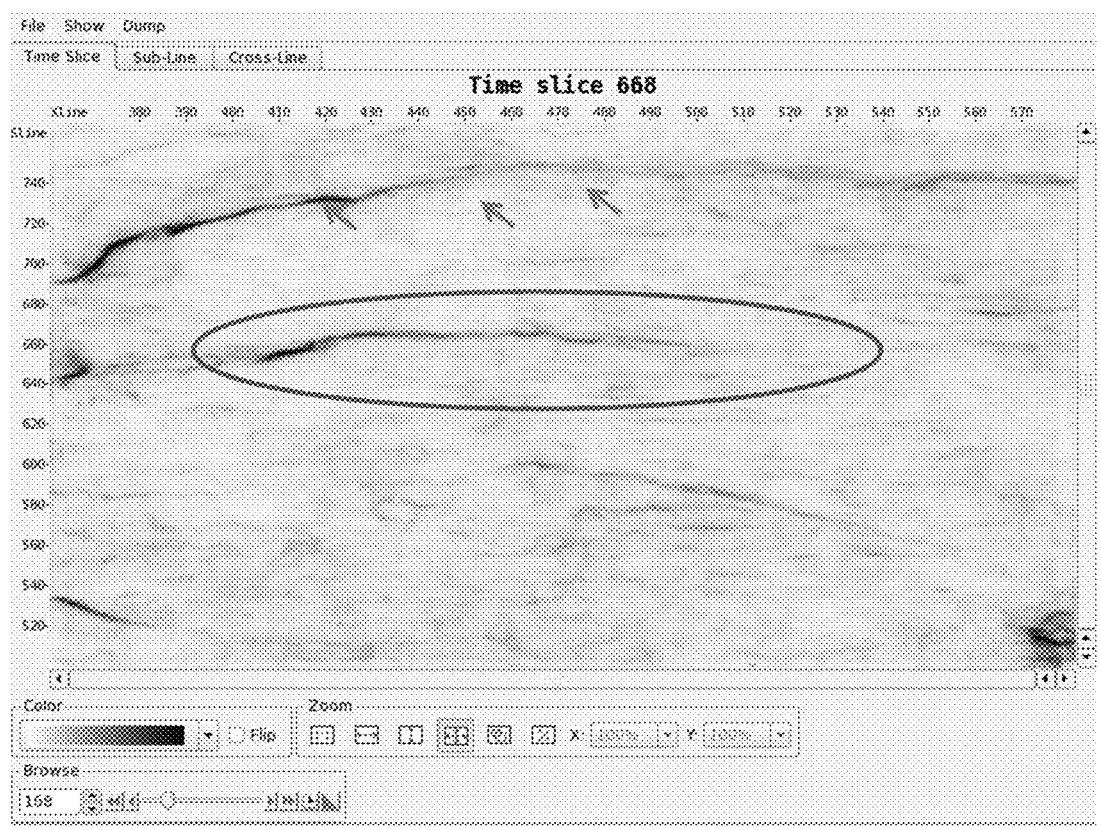
FIG. 8A illustrates an example image produced using the edge detection attributes generated by processing unsmoothed seismic data input, according to an implementation.
Figure 8B:
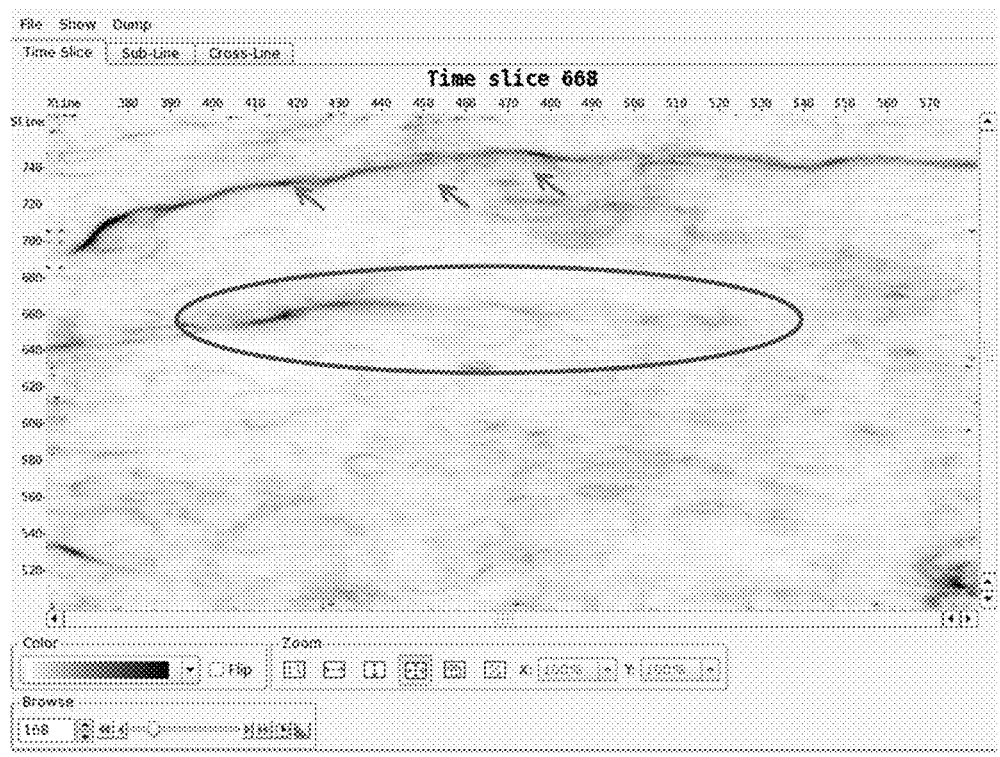
FIG. 8B illustrates an example image produced using the edge detection attributes generated by processing smoothed seismic data input, according to an implementation.
Figure 8C:
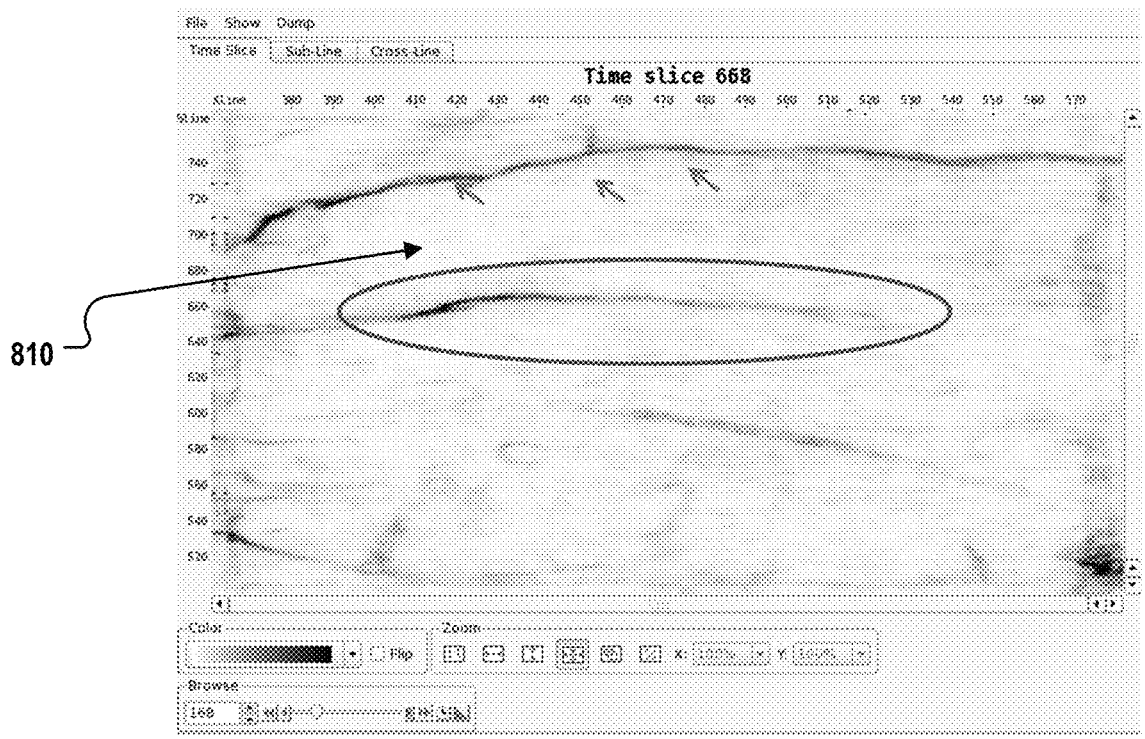
FIG. 8C illustrates an example image produced using the edge detection attributes generated by processing smoothed seismic data input, according to a different implementation.

FIGS. 8A-8C illustrate example images generated based on edge detection attributes, according to an implementation. FIG. 8A illustrates an example image 802 produced using the edge detection attributes generated by processing the unsmoothed seismic data input. FIG. 8B illustrates an example image 804 produced using the edge detection attributes generated by processing the seismic data smoothed with a conventional median filter. FIG. 8C illustrates an example image 806 produced using the edge detection attributes generated by processing the seismic data smoothed with the smoothing method 100. As shown in FIGS. 8A-8C, the image 806 shows a fault line 810, which is more pronounced in the image 806 than in the image 804.

Figure 9A:
FIG. 9A illustrates an example image produced using the skeleton attributes generated by processing unsmoothed seismic data input, according to an implementation.
Figure 9B:
FIG. 9B illustrates an example image produced using the skeleton attributes generated by processing smoothed seismic data input, according to an implementation.
Figure 9C:
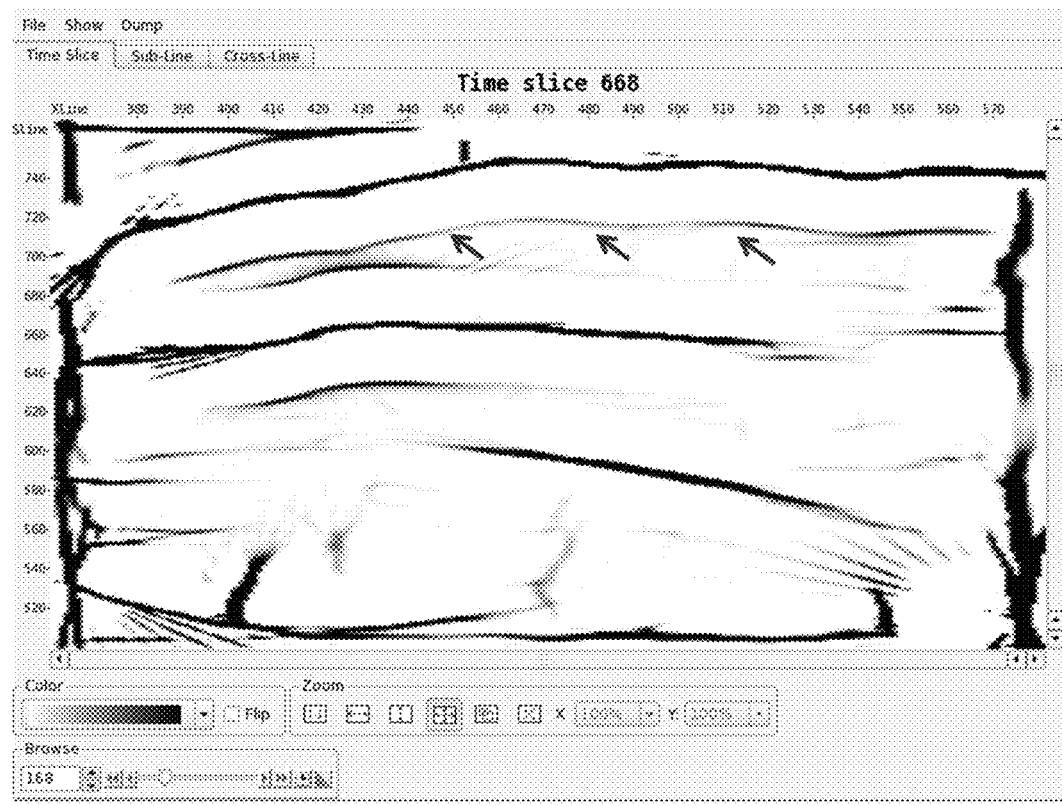
FIG. 9C illustrates an example image produced using the skeleton attributes generated by processing smoothed seismic data input, according to a different implementation.

FIGS. 9A-9C illustrate example images generated based on skeleton attributes, according to an implementation. FIG. 9A illustrates an example image 902 produced using the skeleton attributes generated by processing the unsmoothed seismic data input. FIG. 9B illustrates an example image 904 produced using the skeleton attributes generated by processing the seismic data smoothed with a conventional median filter. FIG. 9C illustrates an example image 906 produced using the skeleton attributes generated by processing the seismic data smoothed with the smoothing method 100. As shown in FIGS. 9A-9C, the image 906 shows a smoother image and clearer fault lines than the image 904.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A method for smoothing seismic data used in a reservoir modeling, comprising:
    obtaining, by a hardware data processing apparatus, a plurality of seismic data samples;
    forming, by the hardware data processing apparatus, guiding vectors using the plurality of seismic data samples and a plurality of guiding structure attributes, wherein the plurality of guiding structure attributes are calculated based on the plurality of seismic data samples, the plurality of guiding structure attributes comprise at least one of an edge detection attribute or a skeleton attribute, the edge detection attribute indicates a presence of subsurface discontinuity, and the skeleton attribute is generated based on the edge detection attribute;
    generating, by the hardware data processing apparatus, a structure guided directional weighted vector filter using the guiding vectors and a plurality of weighting factors;
    filtering, by the hardware data processing apparatus, the plurality of seismic data samples using the structure guided directional weighted vector filter to generate smoothed seismic data; and
    initiating output of the smoothed seismic data.

2. The method of claim 1, further comprising:
    updating the plurality of seismic data samples using the smoothed seismic data; and
    repeating the forming, generating, and filtering until a satisfactory criteria is met.

3. The method of claim 1, wherein the plurality of seismic data samples comprise amplitude data.

4. The method of claim 1, wherein the plurality of seismic data samples comprise 3-dimensional (3D) post-stack seismic data, and the plurality of seismic data samples are segmented into horizontal 2-dimensional (2D) blocks for filtering.

5. The method of claim 1, wherein the plurality of weighting factors are generated using an anisotropic Gaussian function.

6. The method of claim 1, wherein the plurality of weighting factors are generated based on a structure tensor analysis.

7. The method of claim 1, further comprising:
    updating the plurality of guiding structure attributes based on the smoothed seismic data; and
    initiating output of the updated guiding structure attributes.

8. A non-transitory, computer-readable medium storing computer-readable instructions, the instructions executable by a computer and configured to:
    obtain, by a hardware data processing apparatus, a plurality of seismic data samples;
    form, by the hardware data processing apparatus, guiding vectors using the plurality of seismic data samples and a plurality of guiding structure attributes, wherein the plurality of guiding structure attributes are calculated based on the plurality of seismic data samples, the plurality of guiding structure attributes comprise at least one of an edge detection attribute or a skeleton attribute, the edge detection attribute indicates a presence of subsurface discontinuity, and the skeleton attribute is generated based on the edge detection attribute;

generate, by the hardware data processing apparatus, a structure guided directional weighted vector filter using the guiding vectors and a plurality of weighting factors;

filter, by the hardware data processing apparatus, the plurality of seismic data samples using the structure guided directional weighted vector filter to generate smoothed seismic data; and initiate output of the smoothed seismic data.

9. The non-transitory, computer-readable medium of claim 8, wherein the instructions are further configured to:

update the plurality of seismic data samples using the smoothed seismic data; and repeat the forming, generating, and filtering until a satisfactory criteria is met.

10. The non-transitory, computer-readable medium of claim 8, wherein the plurality of seismic data samples comprise amplitude data.

11. The non-transitory, computer-readable medium of claim 8, wherein the plurality of seismic data samples comprise 3-dimensional (3D) post-stack seismic data, and the plurality of seismic data samples are segmented into horizontal 2-dimensional (2D) blocks for filtering.

12. The non-transitory, computer-readable medium of claim 8, wherein the plurality of weighting factors are generated using an anisotropic Gaussian function.

13. The non-transitory, computer-readable medium of claim 8, wherein the plurality of weighting factors are generated based on a structure tensor analysis.

14. The non-transitory, computer-readable medium of claim 8, wherein the instructions are further configured to:

update the plurality of guiding structure attributes based on the smoothed seismic data; and initiate output of the updated guiding structure attributes.

15. A computer system, comprising:

a hardware processor interoperably coupled with a computer memory and configured to:

obtain a plurality of seismic data samples;

form guiding vectors using the plurality of seismic data samples and a plurality of guiding structure attributes, wherein the plurality of guiding structure attributes are calculated based on the plurality of seismic data samples, the plurality of guiding structure attributes comprise at least one of an edge detection attribute or a skeleton attribute, the edge detection attribute indicates a presence of subsurface discontinuity, and the skeleton attribute is generated based on the edge detection attribute;

generate a structure guided directional weighted vector filter using the guiding vectors and a plurality of weighting factors;

filter the plurality of seismic data samples using the structure guided directional weighted vector filter to generate smoothed seismic data; and initiate output of the smoothed seismic data.

16. The computer system of claim 15, wherein the hardware processor is further configured to:

update the plurality of seismic data samples using the smoothed seismic data; and repeat the forming, generating, and filtering until a satisfactory criteria is met.

17. The computer system of claim 15, wherein the plurality of seismic data samples comprise amplitude data.

18. The computer system of claim 15, wherein the plurality of seismic data samples comprise 3-dimensional (3D) post-stack seismic data, and the plurality of seismic data samples are segmented into horizontal 2-dimensional (2D) blocks for filtering.

19. The computer system of claim 15, wherein the plurality of weighting factors are generated using an anisotropic Gaussian function.

20. The computer system of claim 15, wherein the plurality of weighting factors are generated based on a structure tensor analysis.

21. The computer system of claim 15, wherein the hardware processor is further configured to:

update the plurality of guiding structure attributes based on the smoothed seismic data; and initiate output of the updated guiding structure attributes.

* * * * *